Patented Oct. 27, 1953

2,657,232

UNITED STATES PATENT OFFICE 2,657,232

PROCESS FOR PREPARING AMINO ACIDS

Louise K. Borkenhagen, Chicago, Ill., assignor to Armour and Company, Chicago, Ill., a corporation of Illinois No Drawing. Application June 13, 1950, Serial No. 167,936

7 Claims. (Cl. 260—529)

This invention relates to a process for preparing amino acids from protein hydrolysates. More particularly it concerns a method for separating inorganic salts from amino acids by means of an anhydrous organic solvent-ammonia mixture.

The fact that proteins may be readily hydrolyzed to yield amino acids has been a matter of common knowledge for many years. For various reasons, however, these important acids have not been commercially prepared by such means. Instead, it has been found more expedient to manufacture them directly by organic synthesis techniques.

Although amino acids have been prepared synthetically for a considerable length of time, they have not been produced economically enough to warrant their use in further industrial processing. As a result, amino acids have not been as extensively used as might be expected. Nevertheless, the chemical versatility of a single substance possessing both a free amino ($NH_2$) and a free carboxyl (COOH) group in the same molecule has not gone unrecognized. Within the past few decades, uses for such acids have been established in widely separated fields of endeavor.

Proline has been used as a dye intermediate in the photographic field; glycine is employed as a reducing agent and as a catalyst; the sodium salt of glutamic acid has been unrivaled as a synthetic meat flavor; alanine hydrochloride has long been used in the pharmaceutical industry. In the medicinal field, acids like leucine, isolucine, d-lysine, l-cystine, phenyl alanine, l-histidine and l-tryptophane, which are known to be "essential" to the growth and development of all animal life, have been extensively prescribed; derivatives of amino acids have found use as detergents, wetting agents, disinfectants, textile assistants, mothproofers and egg preservatives. Accordingly, a low cost source of uncontaminated amino acids which contain all the acids of native proteins is desired by a variety of industries.

In order to hydrolyze proteins to amino acids, drastic chemical or biochemical action is necessary. Usually such breakdown is accomplished by hydrolyzing native protein with concentrated sulfuric or hydrochloric acid. Dilute inorganic acids are also effective. Organic acids like formic and acetic acid have also been used, but they require higher pressure and temperature to produce amino acids.

Strong alkaline solutions will also yield amino acids from native proteins. This type of hydrolysis requires continued cooking and the amino acids thus produced are partially racemized. Because of the undesirable products thus obtained, alkaline hydrolysis is not extensively employed.

Proteolytic enzymes, of both plant and animal origin, will cleave the protein molecule, but they are hardly feasible as a means of hydrolyzing proteins to amino acids because their hydrolytic action usually stops before any great amount of amino acids are produced. For this reason, the outlook for commercial preparation of amino acids from proteins is at present confined to the acid or alkaline hydrolysis technique.

Mere hydrolysis of proteins to amino acids, however, does not solve the problem of preparing a pure mixture of such acids. Once the proteins are cleaved and amino acids are produced, the question of how to separate them from the alkaline or acid ion of the hydrolyzing agent becomes paramount.

By the usual procedures, sulfate ions are removed with the aid of alkaline earth ions as insoluble barium or calcium sulfate and are called salts of neutralization. However, such precipitates are extremely fine and special filtering means must be used to separate them from the amino acids. Other common methods used for forming insoluble sulfate precipitates are beset with similar difficulties. When sodium or potassium hydroxide are used as hydrolyzing agents for proteins, the problem of removing the sodium or potassium ion is exceedingly difficult. Almost all alkali metal salts, especially sodium and potassium salts are water soluble. Dialysis cannot be used to separate the salt of neutralization because amino acids also pass through ordinary semi-permeable membranes.

I have devised a process for producing salt free amino acid mixtures without resort to the cumbersome and expensive methods outlined above. My process comprises treating a substantially dry protein hydrolysate containing salts of neutralization with an anhydrous ammoniacal-alcohol solvent to effect a preferential solubilization of amino acids therein. The "amino acid rich" solvent is then separated from the insoluble salts by any suitable means. Recovery of the pure amino acids is then accomplished by evaporating the volatile solvent.

Amino acids are as a rule quite insoluble in anhydrous alcohol, proline and oxyproline excepted. According to published data, .0087 grams of d, l-alanine are soluble in 100 grams of ethanol; .00196 grams of aspartic acid are soluble in 100 grams of ethanol; .000897 grams of glycine are soluble in 100 grams of butanol; 0.192 grams of l-leucine are soluble in 100 grams of methanol —all at 25° C. As a practical application, alcohol alone could not be used as a solvent for the separation of amino acids.

Although amino acids are known to be sparingly soluble in liquid ammonia, the use of this material to separate them from the salts of neutralization has not reached a point of practical application because special cooling and handling equipment is necessary for work involving liquid ammonia. With my method of dissolving amino acids in a specific solvent I am able to effect a separation of salt at any temperature between the freezing point and the boiling point of the extracting solvent.

It is quite unexpected to find the unusual solvent properties of an ammoniacal-alcohol solution for amino acids. It is a particularly valuable liquid since it makes amino acid extraction possible at room temperatures without elaborate equipment. Using the above-mentioned solvent and a dry protein hydrolysate containing amino acids and water-soluble or -insoluble salts of neutralization, I have been able to solubilize all of the amino acids of the protein hydrolysate merely by extracting with the solvent. No special conditions are necessary. At room temperatures I have prepared 20% solutions of mixed amino acids in a solvent mixture consisting of 15% gaseous ammonia and 85% anhydrous methyl alcohol.

In one embodiment of my invention, the following procedure has been successfully employed:

To a quantity of spray dried whole blood of cattle was added one and a half weights of water and the same amount of concentrated sulfuric acid. The mixture was heated to its boiling point and kept at this temperature for approximately 2 hours or until a negative test for protein and protein degradation products was obtained. The acid solution of the prepared amino acids was next treated with a decolorizing agent consisting of diatomaceous earth and charcoal to remove the humin formed by hydrolysis. It was next filtered. The filtrate was treated with NaOH to attain a pH of 6.8. This solution was finally dried leaving a mixture of amino acids and sodium sulfate, or salt of neutralization.

At this point, the dry material was incorporated into a substantially anhydrous ammoniacal-alcohol solution made by bubbling gaseous ammonia into commercial methyl alcohol. The mixture was then placed in a capped container which was set in a mechanical shaker and agitated for about one-half hour. After shaking, the solution was filtered and the solvent evaporated from the salt free amino acids. Assay of these acids as determined by benzidine precipitation showed them to be completely free of sulfate ions.

I have found the above to be operable with a variety of protein hydrolysates. Since all proteins of vegetable and animal origin yield amino acids when completely hydrolyzed, it is obvious that my process could be employed wherever salt removal is desired. I have found it to be particularly adaptable to proteins like blood, hair and manufactured glue.

Among acids which may be used to hydrolyze the protein, I employ any of the well known mineral acids ordinarily suitable for such purposes, including sulfuric and hydrochloric acids. Under special conditions phosphoric acid may also be used. Sulfuric acid is the most valuable because of its strong and rapid cleavage action on proteins. Furthermore, when neutralized with ammonium hydroxide or sodium hydroxide, the corresponding sulfate salt is granular in form and at the same time very insoluble in anhydrous ammoniacal solution. It is thus easily separated from the amino acids.

Consideration should be given to the type of salt formed when neutralizing alkaline hydrolysates. For instance, if sodium or potassium hydroxide is used as the hydrolyzing agent, neutralization may be effected with sulfuric acid to form the sulfate salt, although many other acids or acid salts may also be used to neutralize alkaline hydrolysates. I have found that such neutral or alkaline salts as sodium sulfate, potassium or sodium carbonate, barium phosphate, tetrasodium borate and sodium nitrate are equally insoluble in the solvent I use to extract amino acids and readily lend themselves to my process.

Mixtures of salts may be separated from dry protein hydrolysates in precisely the same manner as above described. Typical of such mixtures are those obtained by partially neutralizing a sulfuric acid hydrolysate with ammonia gas or ammonium hydroxide to form ammonium sulfate, and neutralizing the remainder of the solution with calcium hydroxide to form calcium sulfate.

I have found that aliphatic alcohols in combination with gaseous ammonia exhibit the greatest commercially useful solubilizing effect on amino acids. Generally I prefer the low boiling type. Any aliphatic alcohol which will hold ammonia in solution can be utilized in my invention. Alcohols having 1 to 5 carbon atoms in either a straight or branched chain arrangement are especially valuable, and for best results I prefer to use the readily available methyl alcohol.

In the event that one would want to produce a mixed amino acid preparation containing a predetermined amount of salt, it may be accomplished by diluting the alcohol with appropriate amounts of water. The salt content, of course, would be regulated by the inherent solubilities of the particular salt of neutralization in the ammoniacal-alcohol-water mixture. In most instances, I prefer to use substantially anhydrous ammoniacal-alcohol, and, in any case, the amount of water contained in the ammoniacal-alcohol solvent should not exceed 15% by weight of the total solvent mixture.

A mixed amino acid preparation containing a predetermined amount of salt may also be prepared by using, as the substance to be treated with the special anhydrous solvent, a mixture of amino acids and salts containing a predetermined amount of water. Again, however, the amount of water contained in the mixture of amino acids and salt should not exceed 10% by weight of the total mixture.

The amount of ammonia which can be dissolved in the aliphatic alcohols listed above will vary in some degree as a function of the temperature. For practical commercial applications, however, I have learned that, at approximately room temperature and atmospheric pressure, methyl and ethyl alcohol will dissolve from 10 to 15%, by volume, of gaseous ammonia.

I have further found that anywhere from 3 to 5% of gaseous ammonia dissolved in methyl or ethyl alcohol makes an excellent solvent for amino acids. Greater concentrations of ammonia show only slightly increased solubilizing effects. Less than 1%, by volume, of ammonia dissolved in the alcohol, however, results in a sharp drop in the amount of amino acids the solvent will retain at room temperature and atmospheric pressure.

The neutralization of the protein hydrolysate should approach a pH of about 6.0 to 7.0. I prefer to neutralize the hydrolysate to pH 6.5–6.8 for best results. If the extraction of amino acid from salt is carried out at a pH of less than 6.0 the un-neutralized acid used for hydrolyzing the protein will react with the ammonia of the ammoniacal-alcohol and thus reduce the efficiency of this material as a solvent. At a pH substantially above 7.0 the amino acids themselves form salts with the alkaline reagent thus making the isolation of free amino acids impractical. I have also observed that at any pH above or below this range drying of the hydrolysate preparatory to the alcohol treatment becomes exceedingly difficult.

It is apparent that my process could be used to separate amino acids from water-soluble as well as water-insoluble salts. In certain commercial operations where spray drying equipment is available it is more desirable to neutralize the acid or alkaline hydrolysate to form a water-soluble salt. In this form the amino acids and salt can be spray dried directly and the dried material treated with ammoniacal alcohol. If the hydrolysate is neutralized so as to form a water-insoluble salt the entire solution may be pan dried or a separation of the majority of insoluble salt from the water-soluble amino acids may first be made by filtration. The remaining amino acids may then be dried and further purified by treating with the ammoniacal-alcohol solvent.

By way of additionally explaining my invention, the following examples are given:

EXAMPLE #1

500 g. of spray whole blood was hydrolyzed with 700 g. concentrated sulfuric acid and 500 g. water for two hours at 120°–130° C. The resulting mixture was filtered, decolorized, brought to pH 6.5 with ammonia, and evaporated to dryness. 100 g. of this dry amino acid-ammonium sulfate mixture was extracted with 100 cc. 3% ammoniacal methyl alcohol (3% ammonia, 97% anhydrous methyl alcohol) by continuous shaking for fifteen minutes. The mixture was then filtered and the filtrate was evaporated to dryness, whereupon 8.64 g. of mixed salt free amino acids was recovered. Four more extractions carried out in the same manner yielded an additional 14.21 g. of salt free amino acids. An assay of the salt residue showed 99.6% $(NH_4)_2SO_4$.

EXAMPLE #2

500 g. dried hog hair was hydrolyzed with 625 g. concentrated $H_2SO_4$ and 450 g. $H_2O$ for two hours at 120–130° C. It was then filtered, decolorized, neutralized to pH 6.5 with ammonia and dried. 100 g. of the amino acid-ammonium sulfate residue was extracted by continual shaking for 15 minutes with 200 cc. of 3% ammoniacal methyl alcohol (3% ammonia, 97% anhydrous methyl alcohol). The mixture was filtered and the filtrate was evaporated to dryness, whereupon 15.2 g. of mixed salt free amino acids was recovered. Three more extractions carried out in the same manner yielded an additional 12.6 g. of salt free amino acids. An assay of the salt residue showed 98.11% ammonium sulfate.

EXAMPLE #3

500 g. of spray dried hemoglobin was hydrolyzed with 700 g. concentrated sulfuric acid and 500 g. water for two hours. The resulting mixture was filtered, decolorized with activated carbon, brought to pH 6.5 with ammonia, and evaporated to dryness. 100 g. of this dry amino acid-ammonium sulfate mixture was extracted with 200 cc. of 1% ammoniacal alcohol (1% $NH_3$—99% methyl alcohol) by continuous shaking for 15 minutes. The mixture was then filtered and the filtrate was evaporated to dryness yielding 11.8 g. of salt free amino acids. Four more extractions carried out in the same manner yielded an additional 15.42 g. of salt free amino acids. An assay of the salt residue showed 99.26% ammonium sulfate.

EXAMPLE #4

100 g. dried amino acid-salt mixture obtained as indicated in Example 3 was extracted with 200 cc. of 15% ammoniacal alcohol (15% $NH_3$+85% anhydrous methyl alcohol) by shaking for 15 minutes. The mixture was then filtered and the filtrate was evaporated to dryness yielding 24.2 g. of salt free amino acids. Three more extractions carried out in the same manner yielded an additional 6.2 g. of salt free amino acids. An assay of the salt residue showed 99.26% ammonium sulfate.

EXAMPLE #5

100 g. dried amino acid-salt mixture obtained as indicated in Example 3 was extracted with 200 cc. of 3% ammoniacal alcohol (3% $NH_3$ and 97% anhydrous methyl alcohol) by shaking for 15 minutes. The mixture was then filtered and the filtrate was evaporated to dryness yielding 19 g. of salt free amino acids. Two more extractions carried out in the same manner yielded an additional 10 g. of salt free amino acids. An assay of the salt residue showed 98% ammonium sulfate.

EXAMPLE #6

100 g. of dried amino acids obtained as indicated in Example 2 was extracted with 200 cc. of 5% ammoniacal ethyl alcohol (5% $NH_3$, 95% ethyl alcohol) by shaking for 20 minutes. The mixture was then filtered and the filtrate was evaporated to dryness yielding 4.1 g. of amino acids. Four more extractions carried out in the same manner yielded an additional 5.9 g. of amino acids. An assay of the salt residue showed 73.3% ammonium sulfate.

EXAMPLE #7

100 g. of dried amino acid-salt mixture obtained as indicated in Example 2 was extracted with 200 cc. of 5% ammoniacal propyl alcohol (5% $NH_3$, 95% propyl alcohol) by shaking for 20 minutes. The mixture was then filtered and the filtrate was evaporated to dryness yielding 1.93 g. of salt free amino acids. Two more extractions carried out in the same manner yielded an additional 1.1 g. of salt free amino acids. An assay of the salt residue showed 71.5% ammonium sulfate.

EXAMPLE #8

100 g. of dried amino acid, salt mixture obtained as indicated in Example 2 was extracted with 200 cc. of 3% ammoniacal butyl alcohol (3% $NH_3$, 97% butyl alcohol) by shaking for 20 minutes. The mixture was filtered and the filtrate was evaporated to dryness yielding 0.89 g. of salt free amino acids. Three more extractions carried out in the same manner yielded an additional 1.5 g. of salt free amino acids. An assay of the salt residue showed 69.1% ammonium sulfate.

EXAMPLE #9

500 g. of bone glue was hydrolyzed with 500 g. of NaOH and 1000 g. H₂O. The mixture was boiled for 4 hours and then filtered. One half of the filtrate was neutralized to pH 6.5 with concentrated HCl and evaporated to dryness. 100 g. of this dried amino acid-salt mixture was extracted with 200 cc. of 5% ammoniacal methyl alcohol (5% NH₃, 95% anhydrous methyl alcohol) by shaking for 20 minutes. The mixture was then filtered and the filtrate was evaporated to dryness yielding 22.5 g. of salt free amino acids. Four more extractions carried out in the same manner yielded additional 20.3 g. of salt free amino acids. An assay of the salt residue showed 97.4% sodium chloride.

EXAMPLE #10

The second half of the hydrolysate obtained as indicated in Example 9 was neutralized to pH 6.8 with concentrated H₂SO₄ and evaporated to dryness. 100 g. of this dried amino acid-sodium sulfate mixture was extracted with 200 cc. of 3% ammoniacal methyl alcohol by shaking for 20 minutes. The mixture was filtered and the filtrate was evaporated to dryness yielding 20.7 g. of salt-free amino acids. Four more extractions carried out in the same manner yielded an additional 15 g. of salt free amino acids. An assay of the salt residue showed 94.8% sodium sulfate.

EXAMPLE #11

500 g. of bone glue was hydrolyzed with 500 g. of NaOH and 1000 g. of water. The mixture was boiled for four hours and then filtered. The filtrate was neutralized to pH 11 with concentrated H₂SO₄ then to pH 6.5 with concentrated HCl yielding a mixture of amino acids, sodium sulfate and sodium chloride. This mixture was evaporated to dryness. 100 g. of the mixture was extracted with 200 cc. of 3% ammoniacal methyl alcohol by shaking for 15 minutes. The mixture was filtered and the filtrate was evaporated to dryness yielding 21.66 g. of salt-free amino acids. Four more extractions carried out in the same manner yielded an additional 14.6 g. of salt-free amino acids. An assay of the salt residue showed 93.8% salt.

The foregoing examples have been given as illustrations of my invention only. It will be understood that many modifications may be made without departing from the original scope of this invention. Having thus described my invention:

I claim:

1. A method of preparing amino acids comprising chemically hydrolyzing native protein, neutralizing the protein hydrolysate mixture to provide a mixture containing amino acids, water, and salts of neutralization selected from the group consisting of sulfates and chlorides, removing a substantial portion of said water by drying, treating the mixture with a substantially dry ammoniacal alcohol solvent comprising from 1 to 15% by volume of gaseous ammonia dissolved in alcohol containing from 1 to 4 carbon atoms, and separating the solution from said salts.

2. A method of preparing amino acids comprising chemically hydrolyzing native protein, neutralizing the protein hydrolysate mixture to provide a mixture containing amino acids, water, and a sulfate salt of neutralization, removing a substantial portion of said water by drying, treating the mixture with a substantially dry ammoniacal alcohol solvent comprising from 1 to 15% by volume of gaseous ammonia dissolved in alcohol containing from 1 to 4 carbon atoms, and separating the solution from said salts.

3. A method of preparing amino acids comprising chemically hydrolyzing native protein, neutralizing the protein hydrolysate mixture to provide a mixture containing amino acids, water, and a chloride salt of neutralization, removing a substantial portion of said water by drying, treating the mixture with a substantially dry ammoniacal alcohol solvent comprising from 1 to 15% by volume of gaseous ammonia dissolved in alcohol containing from 1 to 4 carbon atoms, and separating the solution from said salts.

4. A method of preparing amino acids comprising chemically hydrolyzing native protein, neutralizing the protein hydrolysate mixture to provide a mixture containing amino acids, water, and salts of neutralization selected from the group consisting of sulfates and chlorides, removing a substantial portion of said water by drying, treating the mixture with a substantially dry ammoniacal alcohol solvent comprising from 3 to 5% by volume of gaseous ammonia dissolved in alcohol containing from 1 to 4 carbon atoms, and separating the solution from said salts.

5. A method of preparing amino acids comprising chemically hydrolyzing native protein, neutralizing the protein hydrolysate mixture to provide a mixture containing amino acids, water, and salts of neutralization selected from the group consisting of sulfates and chlorides, removing a substantial portion of said water by drying, treating the mixture with a substantially dry ammoniacal alcohol solvent comprising from 1 to 15% by volume of gaseous ammonia dissolved in methyl alcohol, and separating the solution from said salts.

6. A method of preparing amino acids comprising chemically hydrolyzing native protein, neutralizing the protein hydrolysate mixture to provide a mixture containing amino acids, water, and salts of neutralization selected from the group consisting of sulfates and chlorides, removing said water by drying, treating the mixture with an anhydrous ammoniacal solvent comprising from 1 to 15% by volume of gaseous ammonia dissolved in methyl alcohol, and separating the solution from said salts.

7. A method of preparing amino acids comprising chemically hydrolyzing native protein, neutralizing the protein hydrolysate mixture to provide a mixture containing amino acids, water, and a sulfate salt of neutralization, removing said water by drying, treating the mixture with an anhydrous ammoniacal alcohol solvent comprising from 3 to 5% by volume of gaseous ammonia dissolved in methyl alcohol, and separating the solution from said salts.

LOUISE K. BORKENHAGEN.

References Cited in the file of this patent

UNITED STATES PATENTS

| Number | Name | Date |
|---|---|---|
| 2,085,784 | Bottoms | July 6, 1937 |
| 2,163,594 | Engels et al. | June 27, 1939 |

(Other references on following page)

UNITED STATES PATENTS

| Number | Name | Date |
|---|---|---|
| 2,203,009 | Calcott et al. | June 4, 1940 |
| 2,222,993 | Toennies | Nov. 26, 1940 |
| 2,384,817 | Chitwood | Sept. 18, 1945 |
| 2,446,192 | Pfister et al. | Aug. 3, 1948 |
| 2,471,053 | Almquist et al. | May 24, 1949 |
| 2,480,644 | Goldsmith et al. | Aug. 30, 1949 |
| 2,504,425 | Kalovec | Apr. 18, 1950 |
| 2,557,913 | Livak et al. | June 19, 1951 |
| 2,557,920 | White | June 19, 1951 |
| 2,564,649 | Rogers | Aug. 14, 1951 |

FOREIGN PATENTS

| Number | Country | Date |
|---|---|---|
| 653,099 | Germany | Nov. 15, 1937 |

OTHER REFERENCES

Foreman, Biochem. J., vol. 13, p. 382 (1919).
Foreman, Biochem. J., vol. 8, pp. 463–466 (1914).
Heintz, Beilstein (Handbuch, 4th ed.), vol. 4, p. 366 (1922).